(12) United States Patent
Benazzi et al.

(10) Patent No.: US 7,267,758 B2
(45) Date of Patent: *Sep. 11, 2007

(54) FLEXIBLE METHOD FOR PRODUCING OIL BASES AND MIDDLE DISTILLATES WITH HYDROISOMERIZATION-CONVERSION FOLLOWED BY CATALYTIC DEWAXING

(75) Inventors: Eric Benazzi, Chatou (FR); Nathalie Marchal-George, Saint Genis Laval (FR); Tivadar Cseri, Courbevoie (FR); Pierre Marion, Antony (FR); Christophe Gueret, St Romain en Gal (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 342 days.

This patent is subject to a terminal disclaimer.

(21) Appl. No.: 10/450,397

(22) PCT Filed: Dec. 13, 2001

(86) PCT No.: PCT/FR01/03975

§ 371 (c)(1),
(2), (4) Date: Nov. 17, 2003

(87) PCT Pub. No.: WO02/48289

PCT Pub. Date: Jun. 20, 2002

(65) Prior Publication Data
US 2004/0065585 A1 Apr. 8, 2004

(30) Foreign Application Priority Data
Dec. 15, 2000 (FR) .................................. 00 16366

(51) Int. Cl.
*C10G 73/38* (2006.01)
*C10G 65/02* (2006.01)

(52) U.S. Cl. .............................. 208/27; 208/49; 208/58; 208/59; 208/62; 502/64; 502/66; 502/74; 585/310; 585/734; 585/736; 585/737

(58) Field of Classification Search .................. 208/27, 208/58, 59, 62, 49; 585/310, 734, 736, 737; 502/64, 66, 74
See application file for complete search history.

(56) References Cited

U.S. PATENT DOCUMENTS

| | | | | |
|---|---|---|---|---|
| 4,554,065 A | * | 11/1985 | Albinson et al. | 208/59 |
| 6,039,864 A | | 3/2000 | Verduijn et al. | |
| 6,051,129 A | | 4/2000 | Santilli et al. | |
| 6,602,402 B1 | * | 8/2003 | Benazzi et al. | 208/58 |
| 6,984,309 B2 | * | 1/2006 | Benazzi et al. | 208/109 |

FOREIGN PATENT DOCUMENTS

| | | |
|---|---|---|
| FR | 2698863 A | 10/1994 |
| FR | 2792978 A | 11/2000 |
| FR | 2805762 A | 9/2001 |
| WO | WO9941336 A | 8/1999 |
| WO | WO 164339 A1 * | 9/2001 |

* cited by examiner

*Primary Examiner*—Glenn Caldarola
*Assistant Examiner*—Prem C. Singh
(74) *Attorney, Agent, or Firm*—Millen, White, Zelano & Branigan, P.C.

(57) ABSTRACT

For producing very high quality base stock and for simultaneously producing high quality middle distillates, successive hydroisomerisation and catalytic dewaxing steps are employed wherein the hydroisomerisation is carried out in the presence of a catalyst containing at least one noble metal deposited on an amorphous acidic support, the dispersion of the metal being 20%-100%. The support is preferably an amorphous silica-alumina. Catalytic dewaxing is carried out in the presence of a catalyst containing at least one hydro-dehydrogenating element (group VIII) and at least one molecular sieve selected from ZBM-30, EU-2 and EU-11.

28 Claims, 2 Drawing Sheets

FLEXIBLE METHOD FOR PRODUCING OIL BASES AND MIDDLE DISTILLATES WITH HYDROISOMERIZATION-CONVERSION FOLLOWED BY CATALYTIC DEWAXING

The present invention relates to an improved process for producing very high quality base stock, i.e., with a high viscosity index (VI), good stability to UV and a low pour point, from hydrocarbon feeds (preferably from hydrocarbon feeds from the Fischer-Tropsch process or from hydrocracking residues), optionally with simultaneous production of very high quality middle distillates (in particular gas oils and kerosine,), i.e., with a low pour point and a high cetane index.

PRIOR ART

High quality lubricants are fundamentally important to proper operation of modem machines, automobiles and trucks.

Such lubricants are usually obtained by a succession of refining steps which can improve the properties of a petroleum cut. In particular, treating heavy petroleum fractions with high linear or slightly branched paraffin contents is necessary to obtain good quality base stock in the best possible yields, using an operation aimed at eliminating linear or very slightly branched paraffins from feeds which are then used as base stock.

High molecular weight paraffins which are linear or very slightly branched which are present in the oils result in high pour points and thus in coagulation for low temperature applications. In order to reduce the pour points, said linear paraffins, which are not or are only very slightly branched, must be completely or partially eliminated.

A further means is catalytic treatment in the presence or absence of hydrogen and because of their form selectivity, zeolites are among the most widely used catalysts.

Zeolite-based catalysts such as ZSM-5, ZSM-11, ZSM-12, ZSM-22, ZSM-23, ZSM-35 and ZSM-38 have been described for use in such processes.

All catalysts currently used in hydroisomerisation are bifunctional, combining an acid function with a hydrogenating function. The acid function is provided by supports with large surface areas (in general 150 to 180 m$^2$/g) with a superficial acidity, such as halogenated aluminas (chlorinated or fluorinated in particular), phosphorus-containing aluminas, combinations of oxides of boron and aluminium, amorphous silica-aluminas and aluminosilicates. The hydrogenating function is provided either by one or more metals from group VIII of the periodic table such as iron, cobalt, nickel, ruthenium, rhodium, palladium, osmium, iridium and platinum, or by combining at least one group VI metal such as chromium, molybdenum or tungsten and at least one group VIII metal.

The balance between the two functions, acid and hydrogenating, is the fundamental parameter which governs the activity and selectivity of the catalyst. A weak acid function and a strong hydrogenating function produces catalysts with low activity which are selective as regards isomerisation, while a strong acid function and a weak hydrogenating function produces catalysts which are highly active and selective as regards cracking. A third possibility is to use a strong acid function and a strong hydrogenating function to obtain a highly active catalyst which is also highly selective as regards isomerisation. Thus by careful choice of each of the functions, the activity/selectivity balance of the catalyst can be adjusted.

In the process of the invention the Applicant proposes jointly producing very good quality middle distillates, base stock with a VI and a pour point at least equal to those obtained with a hydrorefining and/or hydrocracking process.

SUBJECT MATTER OF THE INVENTION

The Applicant's research has been concentrated on developing an improved process for producing very high quality lubricating oils and high quality middle distillates from hydrocarbon feeds, preferably from hydrocarbon feeds from the Fischer-Tropsch process or from hydrocracking residues.

The present invention thus relates to a sequence of processes for joint production of very high quality base stock and very high quality middle distillates (in particular gas oils) from petroleum cuts. The oils obtained have a high viscosity index (VI), low volatility, good UV stability and a low pour point.

More precisely, the invention provides a process for producing oils from a hydrocarbon feed (of which at least 20% by volume preferably has a boiling point of at least 340° C.), said process comprising the following steps in succession:

(a) converting the feed with simultaneous hydroisomerisation of at least a portion of the n-paraffins of the feed, said feed having a sulphur content of less than 1000 ppm by weight, a nitrogen content of less than 200 ppm by weight, a metals content of less than 50 ppm by weight, an oxygen content of at most 0.2% by weight, said step being carried out at a temperature of 200-500° C., at a pressure of 2-25 MPa, with a space velocity of 0.1-10 h$^{-1}$, in the presence of hydrogen, at a ratio generally in the range 100-2000 liters of hydrogen/l of feed, and in the presence of a catalyst containing at least one noble metal deposited on an amorphous acidic support, the dispersion of the noble metal being less than 20%;

(b) catalytic dewaxing of at least a portion of the effluent from step a), carried out at a temperature of 200-500° C., at a pressure of 1-25 MPa, with an hourly space velocity of 0.05-50 h$^{-1}$, in the presence of 50-2000 liters of hydrogen/litre of effluent entering step b)), and in the presence of a catalyst comprising at least one hydrodehydrogenating element and at least one molecular sieve selected from ZBM-30, EU-2 and EU-11 zeolites.

Thus step a) is optionally preceded by a hydrotreatment step generally carried out at a temperature of 200-450° C., at a pressure of 2 to 25 MPa, at a space velocity of 0.1-6 h$^{-1}$, in the presence of hydrogen in a hydrogen/hydrocarbon volume ratio of 100-2000 l/l, and in the presence of an amorphous catalyst comprising at least one group VIII metal and at least one group VIB metal.

All of the effluent from step a) can be sent to step b).

Step a) is optionally followed by separating the light gases from the effluent obtained at the end of step a).

Preferably, the effluent from the conversion-hydroisomerisation treatment a) undergoes a distillation step (preferably atmospheric) to separate compounds with a boiling point of less than 340° C. (gas, gasoline, kerosine, gas oil) from products with an initial boiling point of more than at least 340° C. and which form the residue. Thus in general, at least one middle distillate fraction with a pour point of at most −20° C. and a cetane index of at least 50 is separated.

Catalytic dewaxing step b) is thus applicable to at least the residue from the distillation step, which contains compounds with a boiling point of more than at least 340° C. In a further implementation of the invention, the effluent from step a) is not distilled before carrying out step b). At most, at least a portion of the light gases are separated (by flash) and it then undergoes catalytic dewaxing.

Preferably, step b) is carried out using a catalyst containing at least one molecular sieve wherein the microporous system has at least one principal channel type with a pore opening containing 9 or 10 T atoms, T being selected from the group formed by Si/Al, P, B, Ti, Fe, Ga, alternating with an equal number of oxygen atoms, the distance between two accessible pore openings containing 9 or 10 T atoms being equal to 0.75 mm at most.

Advantageously, the effluent from the dewaxing treatment undergoes a distillation step advantageously comprising atmospheric distillation and vacuum distillation so as to separate at least one oil fraction with a boiling point of more than at least 340° C. It usually has a pour point of less than −10° C., and a VI of more than 95, with a viscosity of at least 3 cSt (i.e., 3 mm$^2$/s) at 100° C. This distillation step is essential when there is no distillation step between steps a) and b).

Advantageously, the effluent from the dewaxing treatment, which has optionally been distilled, undergoes a hydrofinishing treatment.

DETAILED DESCRIPTION OF THE INVENTION

The process of the invention comprises the following steps:

The Feed

The hydrocarbon feed from which the high quality oils and optional middle distillates are produced contains at least 20% by volume of compounds boiling above 340° C., preferably at least 350° C. and advantageously at least 380° C. This does not mean that the boiling point is 380° C. and higher, but 380° C. or higher.

The feed contains n-paraffins. Preferably, the feed is an effluent from a Fischer-Tropsch unit. A wide variety of feeds can be treated using the process.

The feed can, for example, also be a vacuum distillate from straight run crude distillation or from conversion units such as FCC, a coker or from visbreaking, or from aromatic compound extraction units, or originating from AR (atmospheric residue) and/or VR (vacuum residues) or the feed can be a deasphalted oil, or a hydrocracking residue, for example from VD, or any mixture of the feeds cited above. The above list is not limiting.

In general, suitable feeds have an initial boiling point of more than at least 340° C., preferably more than at least 370° C.

The feed introduced into conversion-hydroisomerisation step a) must be clean. The term "clean feed" means feeds in which the sulphur content is less than 1000 ppm by weight, preferably less than 500 ppm by weight, more preferably less than 300 ppm by weight or still more preferably less than 100 ppm by weight. The nitrogen content is less than 200 ppm by weight, preferably less than 100 ppm by weight, more preferably less than 50 ppm by weight. The metal content in the feed, such as nickel or vanadium, is extremely reduced, i.e., less than 50 ppm by weight, more advantageously less than 10 ppm by weight, or preferably less than 2 ppm by weight.

When the amounts of unsaturated or oxygen-containing products can cause too great a deactivation of the catalytic system, the feed (for example from the Fischer-Tropsch process) must undergo hydrotreatment in a hydrotreatment zone before entering the hydroisomerisation zone. Hydrogen is reacted with the feed in contact with a hydrotreatment catalyst the role of which is to reduce the amount of unsaturated and oxygen-containing hydrocarbon molecules (produced, for example, during the Fischer-Tropsch process).

The oxygen content is then reduced to at most 0.2% by weight.

When the feed to be treated is not clean in the sense defined above, it first undergoes a prior hydrotreatment step during which it is brought into contact, in the presence of hydrogen, with at least one catalyst comprising an amorphous support and at least one metal with a hydrodehydrogenating function ensured, for example, by at least one group VIB and at least one group VIII element, at a temperature in the range 200° C. to 450° C., preferably 250° C.-450° C., advantageously 330-450° C. or 360-420° C., at a pressure in the range 5 to 25 MPa and preferably less than 20 MPa, preferably in the range 5 to 20 MPa, the space velocity being in the range 0.1 to 6 h$^{-1}$, preferably 0.3-3 h$^{-1}$, and the quantity of hydrogen introduced being such that the hydrogen/hydrocarbon volume ratio is in the range 100 to 2000 liters/litre.

The support is generally based on (and preferably is essentially constituted by) amorphous alumina or silica-alumina; it can also comprise boron oxide, magnesia, zirconia, titanium oxide or a combination of these oxides. The hydro-dehydrogenating function is preferably fulfilled by at least one metal or compound of a metal from groups VIII and VIB, preferably selected from molybdenum, tungsten, nickel and cobalt.

This catalyst can advantageously contain phosphorus; this compound is known in the prior art to have two advantages for hydrotreatment catalysts: facility of preparation in particular when impregnating with nickel and molybdenum solutions, and better hydrogenation activity.

Preferred catalysts are NiMo and/or NiW on alumina catalysts, as well as NiMo and/or NiW on alumina catalysts doped with at least one element selected from the group formed by phosphorus, boron, silicon and fluorine, or NiMo and/or NiW on silica-alumina catalysts, or on silica-alumina-titanium oxide doped or not doped with at least one element selected from the group formed by phosphorus, boron, fluorine and silicon atoms.

The total concentration of oxides of group VIB and VIII metals is in the range 5% to 40% by weight, preferably in the range 7% to 30%, and the weight ratio, expressed as the metal oxide, of the group VI metal (or metals) to the group VIII metal (or metals) is preferably in the range 20 to 1.25, more preferably in the range 10 to 2. The concentration of phosphorus oxide $P_2O_5$ is less than 15% by weight, preferably less than 10% by weight.

Before being sent to step (a), intermediate separation of water ($H_2O$), $H_2S$ and $NH_3$ can if necessary be carried out on the product obtained at the end of the hydrotreatment step to bring the water, $H_2S$ and $NH_3$ contents to values of less than at most 100 ppm, 200 ppm, 50 ppm respectively in the feed introduced into step (a). At this point, the products with a boiling point of less than 340° C. can optionally be separated in order to treat only a residue in step a).

When a hydrocracking residue is treated, the feed which is present has already undergone a hydrotreatment and a hydrocracking step. The feed proper can then be directly treated in step a).

In general, hydrocracking takes place on a zeolitic catalyst usually based on a Y zeolite, in particular dealuminated Y zeolites.

The catalyst also contains at least one non noble group VIII metal and at least one group VIB metal.

Step a): Hydroisomerisation-conversion

The Catalyst

Step a) takes place in the presence of hydrogen and in the presence of a bifunctional catalyst comprising an amorphous acidic support, (preferably an amorphous silica-alumina) and a metallic hydrodehydrogenating function ensured by at least one noble metal. The dispersion of the noble metal is 20%-100%.

The support is termed amorphous, i.e., free of molecular sieve, and in particular of zeolite, as well as the catalyst. The amorphous acidic support is advantageously an amorphous silica-alumina but other supports can be used. When it is a silica-alumina, the catalyst generally contains no added halogen, apart from that which could be introduced by impregnation, for example with the noble metal.

During this step the n-paraffins, in the presence of a bifunctional catalyst, undergo isomerisation then possibly hydrocracking to result respectively in the formation of isoparaffins and cracking products which are lighter than gas oils and kerosine. The conversion is generally between 5% and 90%, but is generally at least 20% or more than 20%.

In one preferred implementation of the invention, a catalyst comprising a particular silica-alumina is used which can produce highly active catalysts which are also very selective for isomerising feeds such as those defined above.

A preferred catalyst comprises (and is preferably essentially constituted by) 0.05-10% by weight of at least one noble group VIII metal deposited on an amorphous silica-alumina support (which preferably contains 5-70% by weight of silica), with a BET specific surface area of 100-500 $m^2/g$ and the catalyst has:

a mean mesopore diameter in the range 1-12 nm;
a pore volume of pores with a diameter in the range between
  the mean diameter as defined above reduced by 3 nm and
  the mean diameter as defined above increased by 3 nm
  that is more than 40% of the total pore volume;
a noble metal dispersion in the range 20%-100%;
a coefficient of distribution of the noble metal of more than 0.1.

In more detail, the catalyst characteristics are as follows:

Silica content: The preferred support used to produce the catalyst described in the present patent is composed of silica $SiO_2$ and alumina $Al_2O_3$. The silica content of the support, expressed as a percentage by weight, is generally in the range 1% to 95%, advantageously in the range 5% to 95%, more preferably in the range 10% to 80% and still more preferably in the range 20% to 70%, or even 22% to 45%. This silica content can be accurately measured using X ray fluorescence.

Nature of noble metal: For this particular type of reaction, the metallic function is provided by a noble metal from group VIII of the periodic table, more particularly platinum and/or palladium.

Noble metal content: The noble metal content, expressed as the % by weight of metal with respect to the catalyst, is in the range 0.05% to 10%, more preferably in the range 0.1% to 5%.

Noble metal dispersion: The dispersion, representing the fraction of metal accessible to the reactant with respect to the total quantity of the metal of the catalyst, can be measured by $H_2/O_2$ titration, for example. The metal is first reduced, i.e., it undergoes a treatment in a stream of hydrogen at a high temperature under conditions such that all of the platinum atoms which are accessible to hydrogen are transformed into the metal form. Then a stream of oxygen is passed under operating conditions which are such that all of the reduced platinum atoms accessible to the oxygen are oxidised to the $PtO_2$ form. By calculating the difference between the quantity of oxygen introduced and the quantity of oxygen leaving, the quantity of oxygen consumed can be determined. This latter value can be used to deduce the quantity of platinum which is accessible to the oxygen. The dispersion is then equal to the ratio of the quantity of platinum accessible to oxygen over the total quantity of platinum of the catalyst. In our case, the dispersion in the range 20% to 100%, preferably in the range 30% to 100%.

Distribution of noble metal: The noble metal distribution represents the distribution of the metal inside the catalyst grain, the metal being well or poorly dispersed. Thus it is possible to obtain platinum which is poorly distributed (for example detected in a crown the thickness of which is substantially less than the grain radius) but well dispersed, i.e., all of the platinum atoms situated in the crown are accessible to the reactants. In our case, the platinum distribution is good, i.e., the platinum profile, measured using a Castaing microprobe method, has a distribution coefficient of more than 0.1, preferably more than 0.2.

BET surface area: The BET surface area of the support is generally in the range 100 $m^2/g$ to 500 $m^2/g$, preferably in the range 250 $m^2/g$ to 450 $m^2/g$, and for silica-alumina based supports, more preferably in the range 310 $m^2/g$ to 450 $m^2/g$.

Mean pore diameter: For the preferred catalysts based on silica-alumina, the mean pore diameter of the catalyst is measured from the pore distribution profile obtained using a mercury porosimeter. The mean pore diameter is defined as being the diameter corresponding to a zero derivative of the curve obtained from the mercury porosity curve. The mean pore diameter, as defined, is in the range 1 nm ($1 \times 10^{-9}$ meters) to 12 nm ($12 \times 10^{-9}$ meters), preferably in the range 1 nm ($1 \times 10^{-9}$ meters) to 11 nm ($11 \times 10^{-9}$ meters) and more preferably in the range 3 nm ($4 \times 10^{-9}$ meters) to 10.5 nm ($10.5 \times 10^{9}$ meters).

Pore distribution: The preferred catalyst for use in the present invention has a pore distribution such that the pore volume of the pores with a diameter in the range from the mean diameter as defined above reduced by 3 nm and the mean diameter as defined above increased by 3 nm (i.e., the mean diameter ±3 nm) is more than 40% of the total pore volume and preferably in the range 50% to 90% of the total pore volume, more advantageously again between 50% and 70% of the total-pore volume.

Overall pore volume of support: For silica-alumina based supports, it is generally less than 1.0 ml/g, preferably in the range 0.3 to 0.9 ml/g, and more advantageously less than 0.85 ml/g.

The support, and in particular the silica-alumina (used in the preferred implementation) is prepared and formed using the usual methods that are well known to the skilled person. Advantageously, prior to impregnating the metal, the support is calcined, for example by means of a heat treatment at 300-750° C. (preferably 600° C.) 0.25 to 10 hours (preferably 2 hours) in 0-30% by volume of steam (preferably about 7.5% for a silica-alumina matrix).

The metal salt is introduced using one of the usual methods for depositing a metal (preferably platinum and/or palladium, platinum being more preferred) on the surface of a support. One preferred method is dry impregnation, which consists of introducing the metal salt into a volume of solution which is equal to the pore volume of the catalyst mass to be impregnated. Before the reduction operation, the catalyst is calcined, for example in dry air at 300-750° C. (preferably 520° C.) for 0.25-10 hours (preferably 2 hours).

Before using the hydroisomerisation-conversion reaction, the metal contained in the catalyst has to be reduced. One preferred method for reducing the metal is a treatment in hydrogen at a temperature in the range 150° C. to 650° C. and at a total pressure in the range 0.1 to 25 MPa. As an example, reduction consists of a constant temperature stage at 150° C. for 2 hours then raising the temperature to 450° C. at a rate of 1° C./min followed by a constant temperature stage of 2 hours at 450° C.; during the whole of this reduction step, the hydrogen flow rate is 1000 l of hydrogen/l of catalyst. It should also be noted that any ex-situ reduction method is suitable.

The operating conditions under which step a) is carried out are important.

The pressure is generally in the range 2 to 25 MPa (usually at least 5 MPa), preferably 2 (or 3) to 20 MPa and advantageously 2 to 18 MPa; the hourly space velocity is normally in the range 0.1 $h^{-1}$ to 10 $h^{-1}$, preferably in the range 0.2 to 10 $h^{-1}$ and advantageously in the range 0.1 or 0.5 $h^{-1}$ to 5.0 $^{-1}$, and the hydrogen ratio is advantageously in the range 100 to 2000 liters of hydrogen per litre of feed and preferably in the range 150 to 1500 liters of hydrogen per litre of feed.

The temperature used in this step is usually in the range 200° C. to 500° C. (or 450° C.) and preferably in the range 250° C. to 450° C., advantageously in the range 300° C. to 450° C. and more advantageously more than 340° C., for example in the range 320-450° C.

The hydrotreatment and hydroisomerisation-conversion steps can be carried out using two types of catalysts in a plurality (two or more) of different reactors, and/or on at least two catalytic beds installed in the same reactor.

As demonstrated in U.S. Pat. No. 5 879 539, the use of the catalyst below described in step a) increases the viscosity index (VI) by +10 points. More generally, the increase in VI is at least 2 points, the VI being measured on a solvent dewaxed feed (residue) and on the product from step a), also solvent dewaxed, aiming at a pour point temperature in the range −15° C. to −20° C.

In general, the VI is increased by at least 5 points, and usually by more than 5 points, or even 10 points or more than 10 points.

It is possible to control the increase in VI by measuring the conversion. It is thus possible to optimise the production towards high VI oils or to higher oil yields but with a VI that is not as high.

In parallel to increasing the VI, the pour point is usually reduced, from a few degrees up to 10-15° C. or more (for example 25° C.). The size of the reduction varies depending on the conversion and thus on the operating conditions and the feed.

Treatment of Effluent From Step a)

In a preferred implementation, the whole of the effluent from hydroisomerisation-conversion step a) is treated in dewaxing step b). In a variation, at least a portion (and preferably at least the major portion) of the light gases comprising hydrogen and possibly hydrocarbon-containing compounds containing at most 4 carbon atoms can be separated. Hydrogen can be separated first. The implementation (not a variation) with passage of the whole of the effluent from step a) into step b) is of economic interest since a single distillation unit is used at the end of the process. Further, the final distillation (after catalytic dewaxing or subsequent treatments) produces a low temperature gas oil.

Advantageously, in a further implementation, the effluent from step a) is distilled to separate the light gases and also to separate at least one residue containing compounds with a boiling point of more than at least 340° C. Preferably, atmospheric distillation is carried out.

Advantageously, distillation can be carried out to obtain a plurality of fractions (gasoline, kerosine, gas oil, for example) with a boiling point of at most 340° C. and a fraction (residue) with an initial boiling point of more than at least 340° C. and preferably more than 350° C., more preferably at least 370° C. or 380° C.

In a preferred variation of the invention, this fraction (residue) is then treated in a catalytic dewaxing step, i.e., without undergoing vacuum distillation. However in a still further variation, vacuum distillation can be carried out.

In an implementation which is more closely aimed at producing middle distillates, and in accordance with the invention, a portion of the residue from the separation step can be recycled to the reactor containing the conversion-hydroisomerisation catalyst to convert it and increase the production of middle distillates.

In general, the term "middle distillates" as used in this text is applied to fraction(s) with an initial boiling point of at least 150° C. and an end point of just before the residue, i.e., generally up to 340° C., 350° C., preferably less than 370° C. or 380° C.

Before or after distillation, the effluent from step a) can undergo other treatments such as extraction of at least a portion of the aromatic compounds.

Step b): Catalytic Hydrodewaxing

At least a portion of the effluent from step a), which effluent has possibly undergone the separation and/or treatment steps described above, then undergoes a catalytic dewaxing step in the presence of hydrogen and a hydrodewaxing catalyst comprising an acidic function, a metallic hydro-dehydrogenating function and at least one matrix.

It should be noted that compounds boiling above at least 340° C. always undergo catalytic dewaxing.

The Catalyst

The acid function is provided by at least one molecular sieve, preferably a molecular sieve with a microporous system having at least one principal channel type with openings formed by rings containing 9 or 10 T atoms. The T atoms are tetrahedral constituent atoms of the molecular sieve and can be at least one of the elements contained in the following set of atoms: (Si, Al, P, B, Ti, Fe, Ga). Atoms T, defined above, alternate with an equal number of oxygen atoms in the constituent rings of the channel openings. Thus it can also be said that the openings are formed from rings containing 9 or 10 oxygen atoms or formed by rings containing 9 or 10 T atoms.

The catalyst of the invention comprises at least one sieve selected from ZBM-30, EU-2 and EU-11. It can also comprise at least one molecular sieve with the above characteristics.

The molecular sieve forming part of the composition of the hydrodewaxing catalyst can also include other channel types but with openings formed from rings containing less than 10 T atoms or oxygen atoms.

The molecular sieve forming part of the preferred catalyst composition also has a bridging distance, the distance between two pore openings as defined above, which is at most 0.75 nm (1 nm=$10^{-9}$ m), preferably in the range 0.50 nm to 0.75 nm, more preferably in the range 0.52 nm to 0.73 nm; such sieves can produce good catalytic performances in the hydrodewaxing step.

The bridging distance is measured using a molecular modelling tool such as Hyperchem or Biosym, which enables the surface of the molecular sieves under consideration to be constructed using the ionic radii of the elements present in the sieve framework, to measure the bridging distance.

The use of molecular sieves selected in this manner and under the conditions described above selected from the numerous molecular sieves already in existence enables products with a low pour point and a high viscosity index to be produced in good yields in the process of the invention.

Examples of molecular sieves which can be used in the preferred composition of the catalytic hydrodewaxing catalyst are the following zeolites: ferrierite, NU-10, EU-13, EU-1.

Preferably, the molecular sieves used in the composition of the hydrodewaxing catalyst are included in the set formed by ferrierite and EU-1 zeolite.

In general, the hydrodewaxing catalyst comprises a zeolite selected from the group formed by NU-10, EU-1, EU-13, ferrierite, ZSM-22, Theta-1, ZSM-50, ZSM-23, NU-23, ZSM-35, ZSM-48, ISI-1, KZ-2, ISI-4, KZ-1.

The quantity of molecular sieve in the hydrodewaxing catalyst is in the range 1% to 90% by weight, preferably in the range 5% to 90% by weight and more preferably in the range 10% to 85% by weight.

Non limiting examples of matrices used to produce the catalyst are alumina gel, alumina, magnesia, amorphous silica-alumina and mixtures thereof Techniques such as extrusion, pelletisation or bowl granulation can be used to carry out the forming operation.

The catalyst also comprises a hydro-dehydrogenating function ensured, for example, by at least one group VIII element and preferably at least one noble element selected from the group formed by platinum and palladium. The amount of non noble group VIII metal with respect to the final catalyst is in the range 1% to 40%, preferably in the range 10% to 30%. In this case, the non noble metal is often associated with at least one group VIB metal (preferably Mo and W). If at least one noble group VIII metal is used, the quantity with respect to the final catalyst is less than 5% by weight, preferably less than 3% and more preferably less than 1.5%.

When using noble group VIII metals, the platinum and/or palladium is/are preferably localised on the matrix.

The hydrodewaxing catalyst of the invention can also contain 0 to 20%, preferably 0 to 10% by weight (expressed as the oxides) of phosphorus. A combination of group VIB metal(s) and/or group VIII metal(s) with phosphorus is particularly advantageous.

The Treatment

The residue obtained from step a) and distillation and which is treated in this hydrodewaxing step b) has the following characteristics: it has an initial boiling point of more than 340° C. and preferably more than 370° C., a pour point of at least 15° C., a viscosity index of 35 to 165 (before dewaxing), preferably at least 110 and more preferably less than 150, a viscosity at 100° C. of 3 cSt ($mm^2$/s) or more, an aromatic compound content of 10% by weight, a nitrogen content of less than 10 ppm by weight, and a sulphur content of less than 50 ppm by weight or, preferably, 10 ppm by weight.

The operating conditions for the catalytic step of the process of the invention are as follows:

the reaction temperature is in the range 200° C. to 500° C., preferably in the range 250° C. to 470° C., advantageously 270-430° C.;

the pressure is in the range 0.1 (or 0.2) to 25 MPa ($10^6$ Pa), preferably in the range 1.0 to 20 MPa;

the hourly space velocity (HSV, expressed as the volume of feed injected per unit volume of catalyst per hour) is in the range from about 0.05 to about 50, preferably in the range about 0.1 to about 20 $h^{-1}$, more preferably in the range 0.2 to 10 $h^{-1}$.

They are selected to produce the desired pour point.

The feed and catalyst are brought into contact in the presence of hydrogen. The amount of hydrogen used, expressed in liters of hydrogen per litre of feed, is in the range 50 to about 2000 liters of hydrogen per litre of feed, preferably in the range 100 to 1500 liters of hydrogen per litre of feed.

Effluent Obtained

The effluent at the outlet from hydrodewaxing step b) is sent to the distillation train, which preferably integrates atmospheric distillation and vacuum distillation, with the aim of separating the conversion products with a boiling point of less than 340° C. and preferably less than 370° C. (and including those formed during the catalytic hydrodewaxing step), and separating the fraction which constitutes the base stock and for which the initial boiling point is more than at least 340° C. and preferably 370° C. or more.

Further, this vacuum distillation section can separate different grades of oils.

Preferably, before being distilled, at least a portion and preferably the whole of the effluent from the outlet from catalytic hydrodewaxing step b) is sent over a hydrofinishing catalyst in the presence of hydrogen to carry out deep hydrogenation of the aromatic compounds which have a deleterious effect on the stability of the oils and distillates. However, the acidity of the catalyst must be sufficiently weak so as not to lead to the formation of a cracking product with a boiling point of less than 340° C. so as not to degrade the final yields, in particular the oil yields.

The catalyst used in this step comprises at least one group VII metal and/or at least one element from group VIB of the periodic table. The strong metallic functions: platinum and/or palladium, or nickel-tungsten, nickel-molybdenum combinations, are advantageously used to carry out deep hydrogenation of the aromatic compounds.

These metals are deposited and dispersed on an amorphous or crystalline oxide type support, such as aluminas, silicas and silica-aluminas.

The hydrofinishing (HDF) catalyst can also contain at least one element from group VIIA of the periodic table. Preferably, these catalysts contain fluorine and/or chlorine.

The metal contents are in the range 10% to 30% in the case of non noble metals and less than 2%, preferably in the range 0.1% to 1.5%, more preferably in the range 0.1% to 1.0% in the case of noble metals.

The total quantity of halogen is in the range 0.02% to 30% by weight, advantageously 0.01% to 15%, or 0.01% to 10%, preferably 0.01% to 5%.

Catalysts containing at least one noble group VIII metal (for example platinum) and at least one halogen (chlorine and/or fluorine), a combination of chlorine and fluorine being preferred, can be cited as catalysts suitable for use in this hydrorefining step, and lead to excellent performances in particular for the production of medicinal oils.

The following operating conditions are employed for the hydrofinishing step of the process of the invention:

the reaction temperature is in the range 180° C. to 400° C., preferably in the range 210° C. to 350° C., advantageously 230-320° C.;

the pressure is in the range 0.1 to 25 MPa ($10^6$ Pa), preferably in the range 1.0 to 20 MPa;

the hourly space velocity (HSV, expressed as the volume of feed injected per unit volume of catalyst per hour) is in the range from about 0.05 to about 100, preferably in the range about 0.1 to about 30 $h^{-1}$.

Contact between the feed and the catalyst is carried out in the presence of hydrogen. The amount of hydrogen used and expressed in liters of hydrogen per litre of feed is in the range 50 to about 2000 liters of hydrogen per litre of feed, preferably in the range 100 to 1500 liters of hydrogen per litre of feed.

Advantageously, the temperature of the HDF step is lower than the temperature of the catalytic hydrodewaxing step (CHDW). The difference $T_{CHDW}-T_{HDF}$ is generally in the range 20° C. to 200° C., preferably in the range 30° C. to 100° C. The effluent at the outlet from the HDF step is sent to the distillation train.

The Products

The base stock obtained using this process has a pour point of less than −10° C., a VI of more than 95, preferably more than 110 and more preferably more than 120, a viscosity of at least 3.0 cSt at 100° C., an ASTM colour of less than 1 and a UV stability such that the increase in the ASTM colour is in the range 0 to 4, preferably in the range 0.5 to 2.5.

The UV stability test, adapted from the ASTM D925-55 and D1148-55 procedures, is a rapid method for comparing the stability of lubricating oils exposed to a source of ultraviolet radiation. The test chamber is constituted by a metal chamber provided with a rotary plate which receives the oil samples. A bulb producing the same ultraviolet radiation as that of solar radiation placed in the top of the test chamber is directed downwards onto the samples. The samples include a standard oil with known UV characteristics. The ASTM D1500 colour of the samples is determined at t=0 then after 45 h of exposure at 55° C. The results for the standard sample and the test samples are transcribed as follows:

a) initial ASTM D1500 colour;
b) final ASTM D1500 colour;
c) increase in colour;
d) cloudiness;
e) precipitate.

A further advantage of the process of the invention is that it is possible to achieve very low aromatic compound contents of less than 2% by weight, preferably 1% by weight and more preferably less than 0.05% by weight) and even of producing medicinal quality white oils with aromatic compound contents of less than 0.01% by weight. The UV absorbance values of these oils at 275, 295 and 300 nanometers are less than 0.8, 0.4 and 0.3 respectively (ASTM D2008 method) and have a Saybolt colour in the range 0 to 30.

The fact that the process of the invention can also produce medicinal quality white oils is of particular interest. Medicinal white oils are mineral oils obtained by deep refining of petroleum; their quality is subject to different regulations which are aimed at guaranteeing that they are harmless for pharmaceutical applications. They are non toxic and are characterized by their density and viscosity. Medicinal white oils essentially comprise saturated hydrocarbons, they are chemically inert and they have a low aromatic hydrocarbon content. Particular attention is paid to aromatic compounds in particular those containing 6 polycyclic aromatic hydrocarbons (PAH) which are toxic and present in concentrations of one part per million by weight of aromatic compounds in white oil. The total aromatic content can be monitored using the ASTM D2008 method, this UV absorption test at 275, 292 and 300 nanometers enabling an absorbance of less than 0.8, 0.4 and 0.3 respectively to be monitored (i.e., the white oils have aromatic compound contents of less than 0.01% by weight). These measurements are made with concentrations of 1 g of oil per litre, in a 1 cm cell. Commercially available white oils are distinguished by their viscosity and also by their crude of origin which may be paraffinic or naphthenic, these two parameters causing differences both in the physico-chemical properties of the white oils and in their chemical composition.

Currently, oil cuts whether originating from straight run distillation of a crude petroleum followed by extraction of aromatic compounds by a solvent, or from a catalytic hydrorefining or hydrocracking process, still contain non negligible quantities of aromatic compounds. Current legislation in the majority of industrialised nations requires that medicinal white oils must have an aromatic compound content below a threshold imposed by the legislation in each of the countries. The absence of these aromatic compounds in oil cuts results in a Saybolt colour specification which must be substantially at least 30 (+30), a maximum UV adsorption which must be less than 1.60 at 275 nm on a pure product in a 1 centimeter cell and a maximum absorption specification for products extracted by DMSO which must be less than 0.1 for the American market (Food and Drug Administration, standard n° 1211145). This latter test consists of specifically extracting polycyclic aromatic hydrocarbons using a polar solvent, usually DMSO, and checking their content in the extract by measuring the UV absorption in the 260-350 nm range.

The invention will now be illustrated using FIGS. 1 to 3, representing different implementations for the treatment of a feed from the Fischer-Tropsch process or of a hydrocracking residue, for example.

FIG. 1

Figure 1:
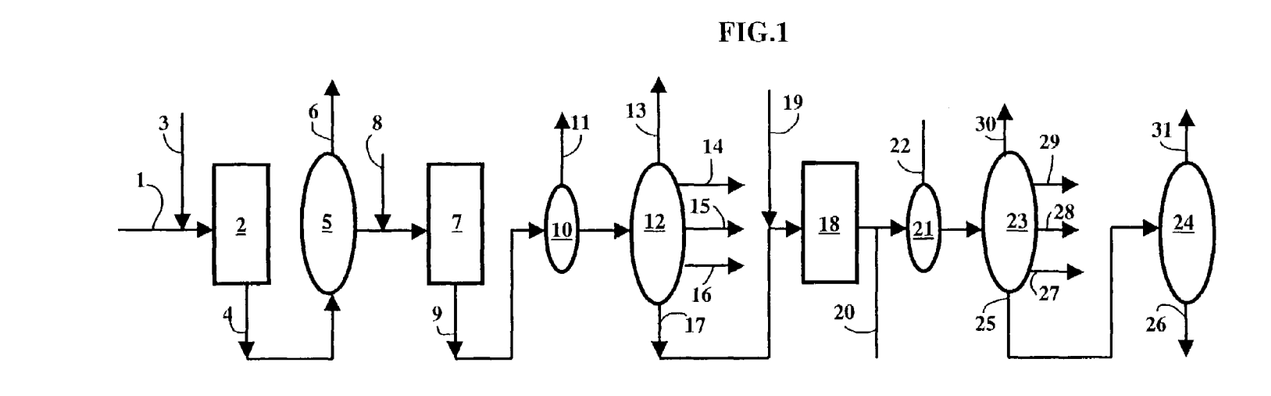

In FIG. 1, the feed enters via a line (1) into a hydrotreatment zone (2) (which can be composed of one or more reactors, and comprises one or more catalytic beds of one or more catalysts) into which the hydrogen enters (for example via line (3)) and where the hydrotreatment step is carried out.

The hydrotreated feed is transferred via line (4) into a hydroisomerisation zone (7) (which can be composed of one or more reactors, and comprises one or more catalytic beds of one or more catalysts) where hydroisomerisation step a) is carried out in the presence of hydrogen. Hydrogen can be supplied via a line (8).

In this figure, before being introduced into zone (7), the feed to be hydroisomerised is freed of a large portion of its water in drum (5), the water leaving via line (6) and possibly ammonia and hydrogen sulphide $H_2S$, when the feed entering via line 1 contains sulphur and nitrogen.

The effluent leaving zone (7) is sent via a line (9) to a drum (10) to separate hydrogen via a line (11); the effluent is then distilled under atmospheric pressure in a column (12) from which a light fraction comprising compounds containing at most 4 carbon atoms and those boiling below this are extracted overhead via a line (13).

At least one gasoline fraction (14) and at least one middle distillate (kerosine (15) and gas oil (16), for example) are obtained.

A fraction containing compounds with a boiling point of more than at least 340° C. is obtained from the bottom of the column. This fraction is evacuated via line (17) to catalytic dewaxing zone (18).

Catalytic dewaxing zone (18) (comprising one or more reactors, one or more catalytic beds of one or more catalysts) also receives hydrogen via a line (19) to carry out step b) of the process.

The effluent leaving via line (20) is separated in a distillation train comprising, in addition to drum (21) for separating hydrogen via a line (22), an atmospheric distillation column (23) and a vacuum column (24) which treats the atmospheric distillation column transferred via line (25), the residue having an initial boiling point of more than 340° C.

The products from the distillations are an oil fraction (line 26), and lower boiling fractions such as gas oil (line 27), kerosine (line 28), gasoline (line 29); light gases are eliminated via line (30) of the atmospheric column and via line (31) of the vacuum distillation column.

The effluent leaving via line (20) can advantageously be sent to a hydrofinishing zone (not shown) (comprising one or more reactors, one or more catalytic beds of one or more catalysts) before being injected into the separation train. Hydrogen can be added to this zone if necessary. The departing effluent is then transferred to drum (21) and the distillation train described above.

In order not to complicate the figure, the hydrogen recycle has not been shown, either from drum (10) to the hydrotreatment and/or hydroisomerisation step, and/or from drum (21) to the dewaxing and/or hydrofinishing step.

FIG. 2

Figure 2:
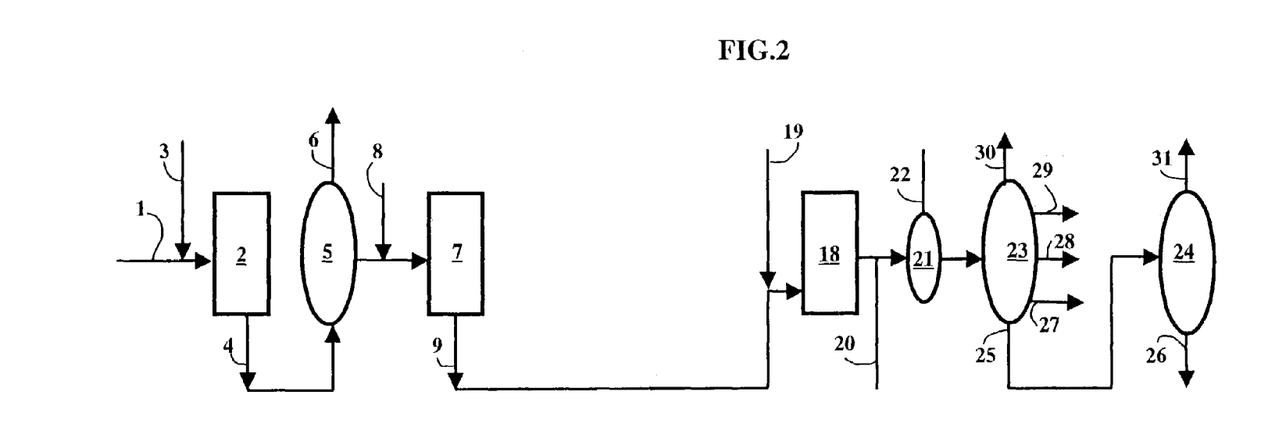

This uses the reference numerals of FIG. 1. In this implementation, the whole of the effluent from hydroisomerisation-conversion zone (7) (step a)) passes directly via line (9) into catalytic dewaxing zone (18) (step b)).

FIG. 3

Figure 3:
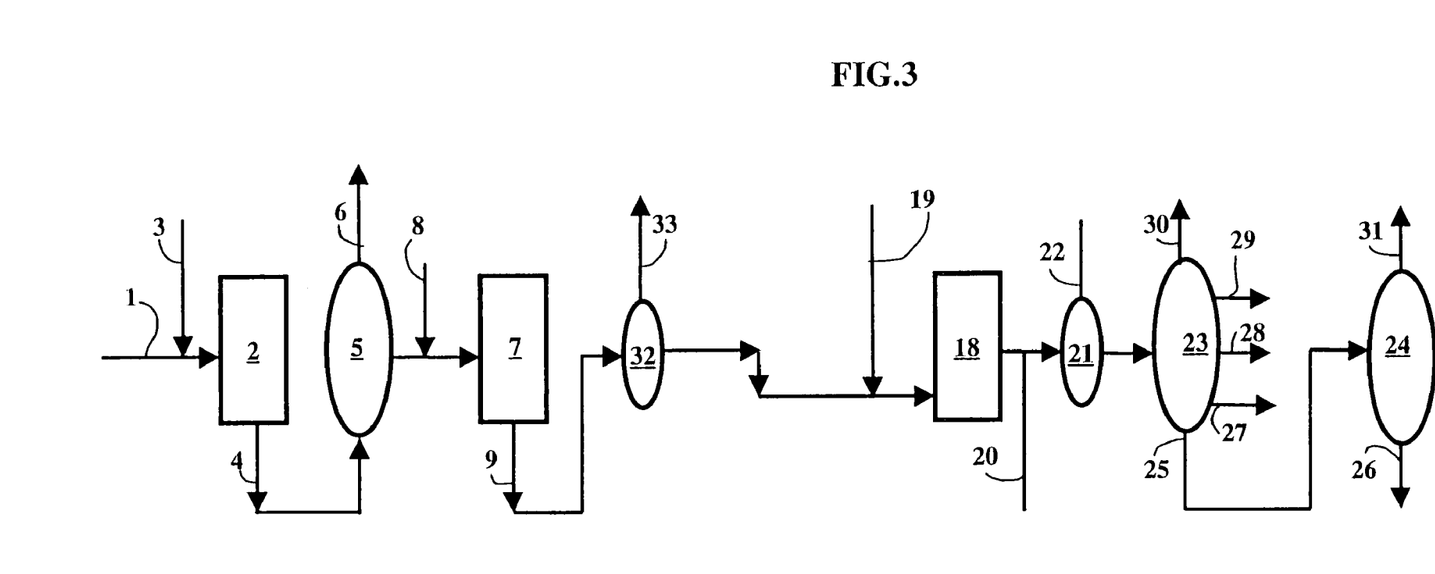

This also uses the reference numerals of FIG. 1. In this implementation, the effluent from the hydroisomerisation-conversion zone (7) (step a) undergoes separation in drum (32) of at least a portion of the light gases (hydrogen and hydrocarbon-containing compounds containing at most 4 carbon atoms), for example by flashing. The separated gases are extracted via line (33) and the residual effluent is sent via line (34) into catalytic dewaxing zone (18).

It should be noted that in FIGS. 1, 2 and 3, the effluent from catalytic dewaxing zone (18) is separated. This separation need not be carried out when said effluent is subsequently treated in a hydrofinishing zone, as separation then takes place after that treatment.

This concerns separation carried out in drums or columns 21, 23, 24.

The invention claimed is:

1. A process for producing oils having an improved pour point and viscosity index from a hydrocarbon feed, said process comprising the following steps in succession:
   (a) converting the feed with simultaneous hydroisomerisation of at least a portion of the n-paraffins of the feed, said feed having a sulphur content of less than 1000 ppm by weight, a nitrogen content of less than 200 ppm by weight, a metals content of less than 50 ppm by weight, an oxygen content of at most 0.2% by weight, said step being carried out at a temperature of 200-500° C., at a pressure of 2-25 MPa, with a space velocity of 0.1-10 $h^{-1}$, in the presence of hydrogen, and in the presence of a catalyst containing at least one noble metal deposited on an amorphous acidic support, the dispersion of the noble metal being 20-100%;
   (b) catalytic dewaxing of at least a portion of the effluent from step a), carried out at a temperature of 200-500° C., at a pressure of 1-25 MPa, with an hourly space velocity of 0.05-50 $h^{-1}$, in the presence of 50-2000 litres of hydrogen/litre of effluent entering step b)), and in the presence of a catalyst comprising at least one hydrodehydrogenating element and at least one molecular sieve selected from ZBM-30, EU-2 and EU-11 zeolites.

2. A process according to claim 1, in which a catalyst containing at least one noble metal deposited on an amorphous silica-alumina is employed in step a).

3. A process according to claim 1, in which in step a), a catalyst is used that is essentially constituted by 0.05-10% by weight of at least one noble group VIII metal deposited on an amorphous silica-alumina support containing 5-90% by weight of silica, with a BET specific surface area of 100-500 $m^2/g$ and the catalyst has:
   a mean pore diameter in the range 1-12 nm;
   a pore volume of pores with a diameter in the range between the mean diameter as hereinbefore defined reduced by 3 nm and the mean diameter as hereinbefore defined increased by 3 nm is more than 40% of the total pore volume;
   a noble metal dispersion in the range 20%-100%;
   a coefficient of distribution of the noble metal of more than 0.1.

4. A process according to claim 1, in which the noble metal in the catalyst for step a) is platinum and/or palladium.

5. A process according to claim 1, in which all of the effluent from step a) is treated in step b).

6. A process according to claim 1, in which the effluent from step a) is distilled to separate the light gases and at least one residue containing compounds with a boiling point of more than at least 340° C., said residue undergoing step b).

7. A process according to claim 1, in which the effluent from step b) is distilled to separate an oil containing compounds with a boiling point of more than at least 340° C.

8. A process according to claim 7, comprising atmospheric distillation followed by vacuum distillation of the atmospheric residue.

9. A process according to claim 1, in which the feed undergoing step a) previously undergoes hydrotreatment then optional separation of water, ammonia and hydrogen sulphide.

10. A process according to claim 1, in which the catalytic dewaxing catalyst also contains at least one zeolite selected from NU-10, EU-1, EU-13, ferrierite, ZSM-22, Theta-1, ZSM-50, ZSM-23, NU-23, ZSM-35, ZSM-38, ZSM-48, ISI-1, KZ-2, ISI-4, and KZ-1.

11. A process according to claim 1, in which the effluent from step b) undergoes a hydrofinishing step before being distilled.

12. A process according to claim 1, in which the treated hydrocarbon feed contains at least 20% by volume of compounds with boiling points above 340° C.

13. A process according to claim 1, in which the treated hydrocarbon feed is selected from effluents from a Fischer-Tropsch unit, vacuum distillates from straight run distillation of crude oil, vacuum distillates from conversion units, vacuum distillates from aromatic compound extraction units, vacuum distillates originating from desulphurisation or hydroconversion of atmospheric residues and/or vacuum residues, deasphalted oils, hydrocracking residues or any mixture of said feeds.

14. A catalyst comprising at least one molecular sieve selected from ZBM-30, EU-2, and EU-11, and at least one other molecular sieve the microporous system of which has at least one principal channel type with openings formed from rings containing 10 or 9 tetrahedral T atoms, T being at least one of elements Si, Al, P, B, Ti, Fe, Ga.

15. A catalyst according to claim 14, in which said at least one other molecular sieve is selected from NU-10, EU-1, EU-13, ferrierite, ZSM-22, Theta-1, ZSM-50, ZSM-23, NU-23, ZSM-35, ZSM-38, ZSM-48, 151-1, KZ-2, ISI-4, and KZ-1.

16. A catalyst according to claim 14, in which the amount of the molecular sieve is 1-90% by weight.

17. A catalyst according to claim 14, further comprising a matrix.

18. A catalyst according to claim 17, in which the matrix is selected from the group formed by alumina gels, aluminas, magnesia, amorphous silica-alumina and mixtures thereof.

19. A catalyst according to claim 14, in which the hydro-dehydrogenating function is provided by at least one element from group VIII.

20. A catalyst according to claim 19, in which the element is platinum and/or palladium.

21. A catalyst according to claim 19, in which the hydro-dehydrogenating function is provided by 1-40% by weight of at least one non-noble metal from group VIII and at least one metal from group VIB.

22. A catalyst according to claim 19, containing 0-20% (by weight of oxide) of phosphorus.

23. A catalytic hydrodewaxing process according to claim 1 wherein said at least one molecular sieve comprises ZBM 30.

24. A catalytic hydrodewaxing process according to claim 1 wherein said dispersion of the noble metal is 30-100%.

25. A catalytic hydrodewaxing process according to claim 23 wherein said dispersion of the noble metal is 30-100%.

26. A catalytic hydrodewaxing process according to claim 25 wherein the noble metal catalyst comprises platinum.

27. A catalytic hydrodewaxing process according to claim 10 wherein said dispersion of the noble metal is 30-100%.

28. A catalyst according to claim 15 comprising ZBM-30.

* * * * *

UNITED STATES PATENT AND TRADEMARK OFFICE
CERTIFICATE OF CORRECTION

| | |
|---|---|
| PATENT NO. | : 7,267,758 B2 |
| APPLICATION NO. | : 10/450397 |
| DATED | : September 11, 2007 |
| INVENTOR(S) | : Eric Benazzi |

It is certified that error appears in the above-identified patent and that said Letters Patent is hereby corrected as shown below:

Title Page Item (86), date reads "Nov. 17, 2003" should read -- June 13, 2003 --
Column 15, line 13, reads "151-1," should read -- ISI-1, --

Signed and Sealed this

Twenty-ninth Day of April, 2008

JON W. DUDAS
*Director of the United States Patent and Trademark Office*